United States Patent [19]
Snyder

[11] Patent Number: 5,339,577
[45] Date of Patent: Aug. 23, 1994

[54] LAMINATED NON-COMBUSTIBLE BOARD FOR FORMING DUCTWORK AND HEADERS

[76] Inventor: Darryl L. Snyder, 4520 N. Market St., Canton, Ohio 44714

[21] Appl. No.: 986,357

[22] Filed: Dec. 8, 1992

[51] Int. Cl.⁵ .............................................. E04B 7/00
[52] U.S. Cl. ........................................ 52/95; 52/631; 52/799
[58] Field of Search .......................... 52/799, 631, 95

[56] References Cited

U.S. PATENT DOCUMENTS

| | | | |
|---|---|---|---|
| 2,101,836 | 12/1937 | Benedict | 52/799 X |
| 2,221,309 | 11/1940 | Gazelle | 52/799 X |
| 3,449,157 | 6/1969 | Wandel | 52/799 X |
| 3,731,449 | 5/1973 | Kephart | 52/631 |
| 3,803,784 | 4/1974 | Becker | 52/799 X |
| 4,070,839 | 1/1978 | Clem | 52/799 X |
| 4,704,837 | 11/1987 | Menchetti et al. | 52/631 |

*Primary Examiner*—Peter M. Cuomo
*Assistant Examiner*—Jerry Redman
*Attorney, Agent, or Firm*—E. J. Holler

[57] ABSTRACT

The present invention relates to a laminated structural sheet material or board having a planar configuration and comprising a hollow core portion and metallic foil exterior surfaces especially useful for forming ductwork, headers and deflectors in heating and cooling systems. The sheet material is substantially moistureproof, smokeproof and fireproof for forming such ductwork, headers and deflectors in combination with ceiling and/or floor joists and flooring materials, the material or board being readily bendable and having scored edges for attachment to wooden ceiling and/or floor joists in planar or angled relation.

27 Claims, 3 Drawing Sheets

LAMINATED NON-COMBUSTIBLE BOARD FOR FORMING DUCTWORK AND HEADERS

TECHNICAL FIELD

The present invention relates to a laminated structural sheet material or board having an essentially hollow core portion and metallic foil exterior surfaces for forming ductwork and headers in heating and cooling ducts. The sheet material is substantially moistureproof, fireproof and smokeproof for forming such ductwork, and headers in combination with ceiling and/or floor joists and flooring materials, the material being readily bendable and having parallel scored edges for attachment to wooden ceiling and/or floor joists.

BACKGROUND OF THE INVENTION

It has been conventional practice in building structural buildings for both residential and commercial use to form the major portions of heating and cooling ducts using sheet metal such as galvanized sheet steel. The ducts must be fabricated on the job site by metalworking personnel who must cut and shape the sheets to size to form the ducts and associated headers to lead to registers located in both floors and walls as well as ceilings. Many prior art forms of such ducts and headers have tried to provide insulated ductwork in the form of sheets, but virtually all forms have been either too costly or difficult to install in a timely and efficient manner. Many have involved sheets having spacer means therewithin for creating air gaps between roofs and ceilings, and insulation by providing the sheet with corrugations and insulating material.

The use of sheet metal in forming ductwork is expensive and time-consuming in the construction of buildings requiring special skills for metalworking and its installation. Such all-metal ducts experience damage due to dampness which can and does occur in the ducts resulting in deterioration of the ducts and adjacent wooden members such as floors and joists. The all-metal ducts have no insulating value unless some form of insulating material be additionally provided. The ducts when employed to carry heated or cooled air experience uncontrolled expansion and/or contraction which cause undesirable sound effects when the ducts create small to large unexpected and irregular boomlike effects. The dampness, over time, also causes rusting of the ductwork and its attachment means such as nails or staples.

In addition to the aforesaid types of metal sheeting for ductwork, other forms of heat-reflective insulation can be manufactured in collapsed form, such as being rolled upon itself into a compact cylindrical roll, for storage and transportation. The insulation can be unrolled and expanded for insulation by attachment to adjacent structural members such as floor and ceiling joists in a building. The insulation is folded in such a manner that the material in flat form, which may be folded by accordion pleats, can be cut to size for installation in lengthy runs as required. Such material is intended to provide heat reflective insulation of predetermined dimensions to fit within the framework of a building with marginal edge portions for attachment to structural members. Such insulation is intended to serve an insulating purpose only and is not designed to provide ductwork as such. Actually, it does not have the structural strength, or rigidity to form ductwork, deflectors or headers in heating or cooling systems.

In the manufacture and use of metal sheet material for ductwork, the material is normally called "panning material" for forming such ducts and headers leading to forced air or gravity flow air registers in floors, walls and ceilings. The term "panning" has become a generic word in the trade for material which is used in flat form in many cases and is bent into various shapes and contours for customized ductwork depending upon the structural requirements of the particular building.

Accordingly, it is a primary object of this invention to provide a structural panning material or board for forming ductwork and headers, the material being rigid and yet plyable, moistureproof, fireproof and smokeproof for such purposes.

Another object of this invention is to provide a new and improved panning material which is economical to manufacture and install in many shaped contours in forming ducts and headers, the material being simplified in design, fireproof, strong and durable for long-term use for the intended purposes. The material combines the best features of corrugated paper board and heat-reflective metallic foil exterior surfaces as well as scored side edge portions for ready installation in both planar and angled relation.

A still further object of this invention is to provide a durable moistureproof, fireproof and smokeproof structural panning material which is relatively rigid yet plyable and bendable to form various configurations of heating and cooling ducts, and header members which are utilized therewith, the material having a substantial bursting strength and a suitable fire resistance rating for safe and approved use in both residential and commercial buildings.

SUMMARY OF THE INVENTION

This invention relates to a structural laminated rigid panning material for forming heating and cooling ducts between spaced-apart ceiling and floor joists, the material being plyable and having a core portion of non-metallic paper corrugating medium and paper linerboard with metallic foil exterior surfaces and parallel scored edge portions for installation of the material between the joists both in planar and/or angular relation.

The material may be permanently installed by nailing or stapling the edge portions to wooden joists in an expedient manner, either to the bottom edges of such joists in planar relation or bent at right angles thereto for attachment between the joists to their inner juxtaposed surfaces. The material has an inherent thermally-insulating property to assist the conduction of both hot and cold air from conveyed air channels without significant thermal reduction or losses. The material when properly installed provides air-tight channels leading to floor, wall and ceiling registers.

The subject panning board is semi-rigid and bendable in straight lines at the score lines located adjacent the edges of the sheet for ready installation. The facing thin metallic foil on both exposed surfaces provides a radiation barrier of the reflective type to reflect energy received by radiation. Thin aluminum foil is preferred for the radiation and moistureproof barrier and is readily laminated to the basic core sheet material for all paper components. The board is especially useful for ductwork and headers when applied to the underside of ceiling and floor joists as well as the space therebetween.

BRIEF DESCRIPTIONS OF THE DRAWINGS

The aforesaid objects and features of this invention and the manner of attaining them will readily become apparent and the invention herein disclosed will be best understood by reference to the following description of the invention in conjunction with the accompanying drawings, wherein.

In the accompanying drawings, like reference characters refer to the same or similar parts throughout the several views.

DETAILED DESCRIPTION OF A PREFERRED EMBODIMENT

In accordance with the subject invention a high-strength laminated board 10 is provided which is adapted to ready manufacture as corrugated paper liner board such as employed in making corrugated boxes and which has thin metallic foil adhered to its exterior surfaces to provide heat reflective facings. The board is laminated with heat and fire proof adhesive materials which make the board moisture-resistant for long term durable use in building construction. The board has its corrugated folds extending transversely to scored edge lines for expedient installation to ceiling and/or floor joists by nailing, stapling or adhesion as desired or required. The board is formed in flat planar form but may be bent or inclined at its edges using the scored portions for varied installation requirements. The plyable nature of the board lends itself to slight bending of the board without separation of the laminated layers of component materials.

The following description of the laminated lightweight sheet or board 10 is provided to permit reference to the drawings and give a more detailed understanding of the invention.

Figure 1:
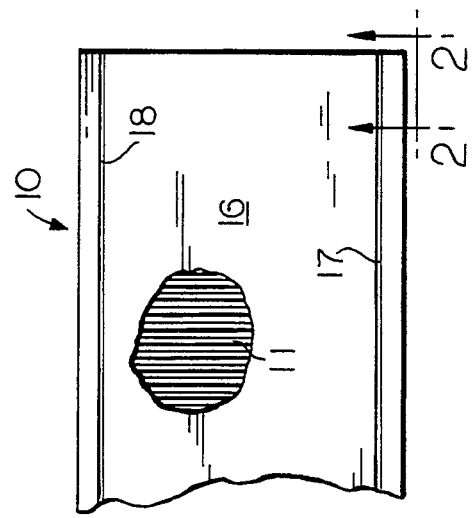
FIG. 1 is a top plan view of the project panning board of this invention showing in a fragmentary partial view the corrugated medium member of the core portion.

FIG. 1 shows in a top plan view the rectangular shape of the board 10 having an interior core portion primarily comprised of a corrugated paper folds 11 which extend transversely to the length of the board. The board may be formed in varying widths ranging from about 12 to 48 inches in width, and lengths ranging from 1 to 8 feet for easy handling and severing as required. The board is formed on a corrugated board forming machine called a corrugator with the folds in the form of uniform sine waves having paper linerboard 12 adhesively attached to its crown portions in both sides thereof.

Figure 2:
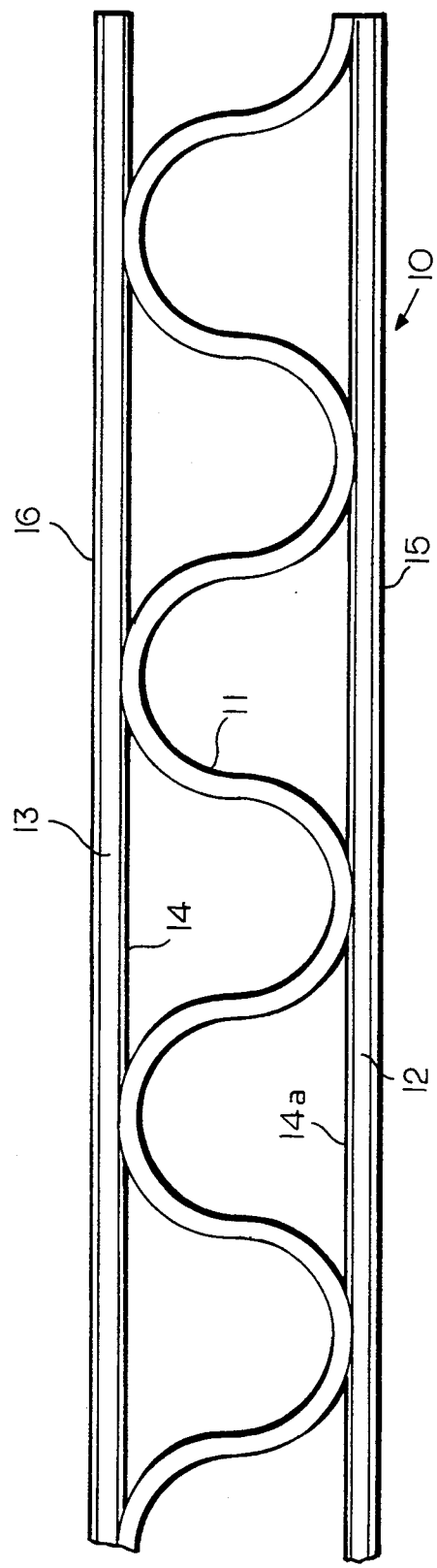
FIG. 2 is an enlarged cross-sectional view of the panning board taken along the line 2—2 of FIG. 1 showing the core structure and layered exterior materials forming a sandwich-type structure.

FIG. 2 shows in a greatly enlarged cross-sectional view the board 10 with its central core portion comprised of the corrugating medium 11 formed of paper having a thickness of about 0.009 inch of preferably 26 pound fiber board. The crowns of the medium are covered co-extensively with sheets of the paper linerboard 12 and 13 and permanently affixed thereto by a fireproof adhesive material 14 and 14a such as Timin Co. Product No. R6157.00 waterproof adhesive. The linerboard preferably has a thickness of about 0.012 inch of 42 pound fiber board. The adhesive or glue layers 14 and 14a are applied to the crowns of the corrugated medium 11 following the making of the paper core 11 normally made on the corrugating machine.

Thin sheets of aluminum foil 15 and 16 having a thickness of about 0.00025 inch are affixed to the linerboard surfaces preferably using a Swifts Product No. 47646 adhesive material. The aluminum foil sheets 15 and 16 are adhered to the linerboard co-extensively therewith so that the board exterior is heat reflective and fireproofed with a high heat and smoke resistance. The board has an overall thickness ranging from about 0.14 to 0.17 inch and a bursting strength by the Mullen test of over 300 psi, about 0.15 inch overall thickness being preferred.

Figure 3:
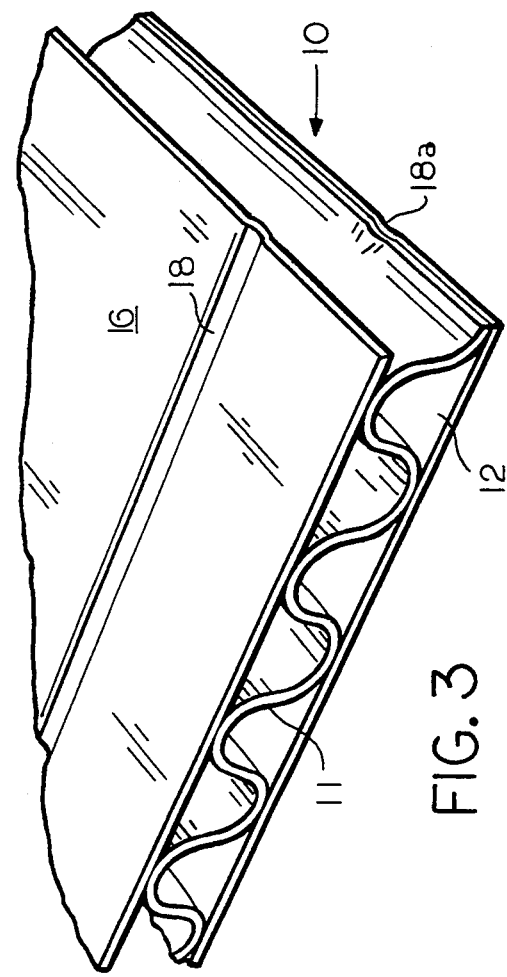
FIG. 3 is a fragmentary perspective view of one corner of the subject panning board shown in FIGS. 1 and 2.

As shown in FIGS. 1 and 3 the board is scored along the edges of its narrower dimension on both sides thereof. The scores 17 and 18 are formed to a depth ranging from about 0.025 to 0.035 inch to facilitate right-angled or lesser angle bending of the marginal scored portions at the edges. The scores are formed about 0.75 to 1.0 inch from the edges to permit easy joinder of the board to ceiling or floor joists or wall studs as desired by varied procedures. Spaced apart nails or stapling are used effectively and efficiently for attachment to wooden joists or studs.

FIG. 3 shows in a fragmentary perspective view one corner of the board in enlarged detail in planar form, the scores 18 and 18a being located in juxtaposed relation on both sides of the board. The lineal scores are sufficiently deep to permit flexure and bending of the board in straight lines at the marginal areas to any desired angle for installation.

Figure 4:
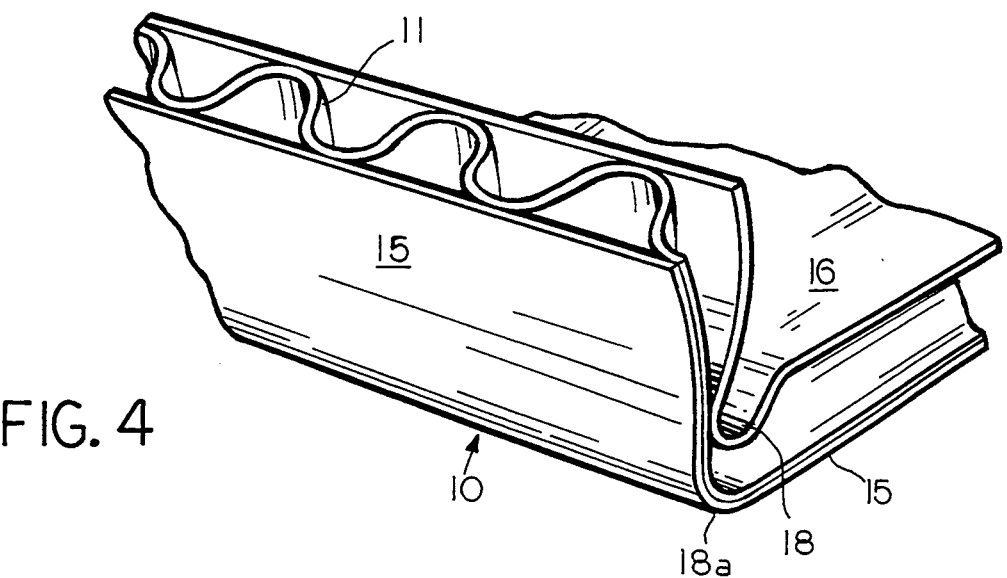
FIG. 4 is another fragmentary perspective view of the subject panning board showing the plyable and bendable nature of its scored edge portions for permanent attachment to ceiling and/or floor joists to form heating and cooling ducts.

FIG. 4 shows in another fragmentary view how the board may be bent through a right-angle without any separation of its laminated layers, while maintaining its strength in two dimensions.

Figure 5:
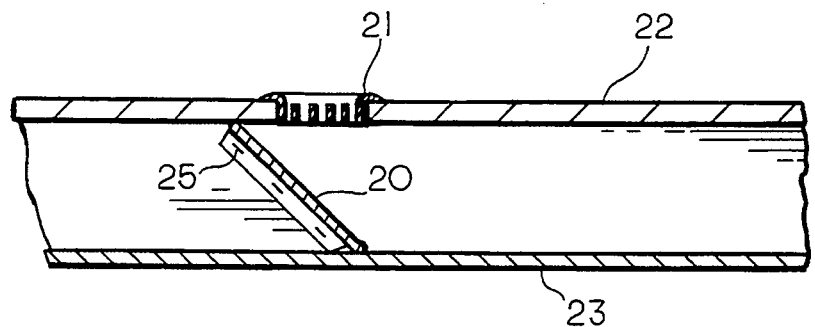
FIG. 5 is a cross-sectional view of the subject panning board employed between ceiling and/or floor joists forming header members only in heating and cooling ducts leading to floor registers.

FIG. 5 shows in a cross-sectional view how the board may be installed as a header or deflector 20 between ceiling or floor joists closely adjacent to a floor or wall register 21. The floor is designated by the numeral 22 and ceiling material is designated by the numeral 23 which may consist of drywall or plastering material. In this situation the subject board is only used for the limited purpose of deflecting or directing the air flow to the floor register 21.

Figure 6:
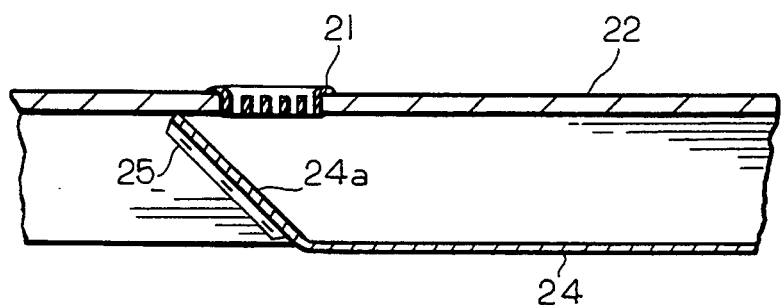
FIG. 6 is a cross-sectional view of the subject panning board comparable to the showing in FIG. 5 wherein the board is employed to form both headers and ducts between ceiling and/or floor joists.

FIG. 6 is another view of a preferred use of the board comparable to FIG. 5, wherein the board is employed to form both the ductwork member 24 and the header or deflector 26 from a single sheet of the board. The board is readily adaptable to cutting with simple hand tools and attachment by a stapling gun very quickly and efficiently. The scores are formed preferably about 13/16 inch from each side of the board by so-called point-to-point scoring tools during continuous manufacture of the board. Spaced apart staples 25 are shown in FIGS. 5 and 6 fastening the board in place as deflectors or headers.

Figure 7:
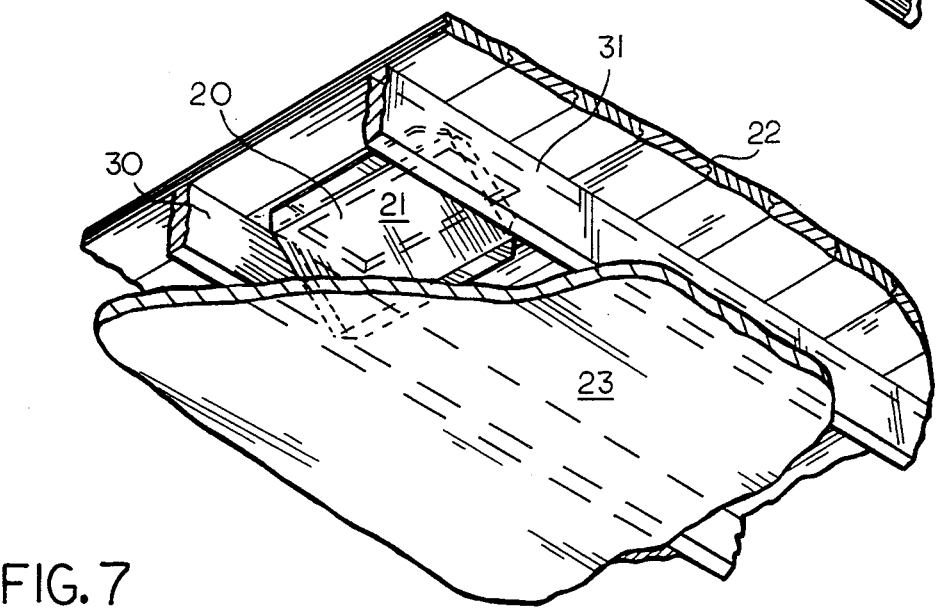
FIG. 7 is a perspective view of the panning board as shown in FIG. 5 showing the board forming header members only of heating and/or cooling ducts.

FIG. 7 is a perspective view of the board mounted between the ceiling joists 30 and 31 in the form of a deflector or header 20 as shown in FIG. 5. The flooring material 22 comprises the upper surface of the ductwork and the ceiling material 23 comprises the lower surface of the ductwork. The header 20 is located adjacent to the register 21 to direct air thereto.

Figure 8:
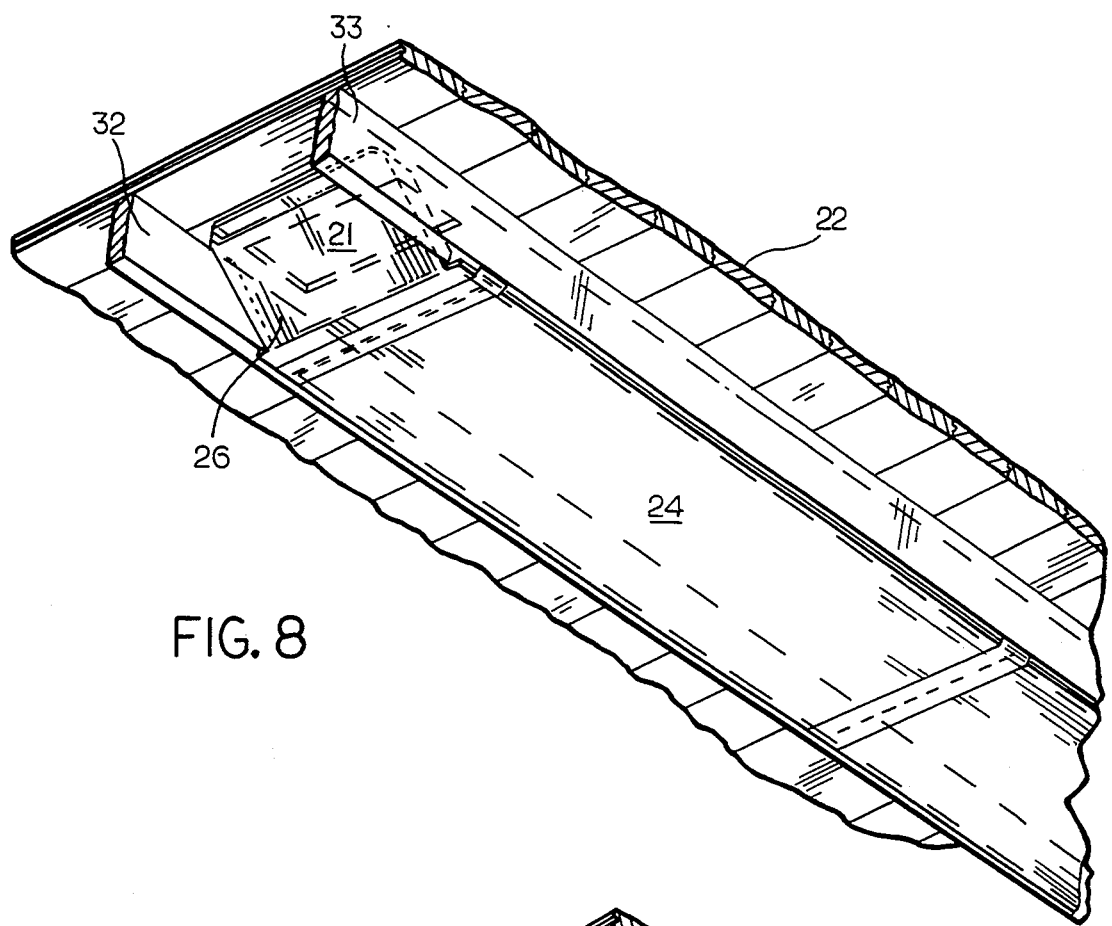
FIG. 8 is a perspective view of the panning board as shown in FIG. 6 showing the board forming both headers and ducts between ceiling and/or floor joists.

FIG. 8 is a perspective view of the board comprising both the header 26 and the duct bottom member 24 between floor joists 32 and 33.

The board is made having a rectangular shape with waterproof and fireproof adhesives. The board preferably has a length of 48 inches and widths ranging from 12, 16, 24, and 48 inches for forming wide ductwork panning as well as narrow panning to fit between parallel joists having 3 to 32 inch spacing, for example.

The board has a fire resistance rating by the open cup method of above 70° F. and a density of about 0.15 pound per square foot. The board is thermally insulating primarily due to its hollow core and heat reflective exterior surfaces. The board has a flame spread index value of 70 and a smoke developed index value of 30 as tested by the ASTM E84-90 standard test method for surface burning characteristics of building materials. Both ratings are fully satisfactory for use of the material in homes and commercial buildings. The bursting strength of greater than 300 psi prevents accidental damage to the board during installation as well as during long-term use.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Having now described the features, discoveries and principles of the invention, the manner in which the laminated non-combustible board for forming ductwork and headers therefore is constructed and used in several forms, the characteristics of the construction, and the advantageous, new and useful results obtained; the new and useful structures, devices, elements, arrangements, parts and combinations, are set forth in the appended claims.

I claim:

1. A structural laminated panning material for forming heating and cooling ducts between spaced-apart framing members of a structure, said material comprising a core portion of combined non-metallic paper corrugating medium and paper linerboard members fully co-extensive with said paper corrugating medium and thin metallic foil facing members adhesively attached to and fully co-extensive with said paper linerboard members, said panning material having an overall width greater than the spacing of said framing members, and a pair of parallel score lines formed adjacent at least two juxtaposed terminating edges of said panning material, said pair of score lines extending perpendicular to the corrugations of said paper corrugating medium for permanent attachment to said framing members in either planar or angled relationship.

2. The structural panning material in accordance with claim 1, wherein the said core portion and said thin metallic foil facing members are joined to said paper linerboard members into a sandwich-type thermally-insulating substantially fireproof panning material by waterproof and fireproof adhesive material.

3. The structural panning material in accordance with claim 2, wherein the said panning material has an overall thickness ranging from about 0.14 to 0.17 inch and a bursting strength by the Mullen test of about 300 psi.

4. The structural panning material in accordance with claim 1, wherein each of said pair of parallel score lines is scored on both sides to a depth ranging from about 0.025 to 0.035 inch to facilitate angled bending and secure attachment of said panning material to said framing members.

5. The structural panning material in accordance with claim 1, wherein the said pair of parallel score lines is formed on both sides of said material in juxtaposed relation about 0.75 to 1.0 inch from each edge of said panning material.

6. The structural panning material in accordance with claim 1, wherein the said panning material has a rectangular shape in plan and a width ranging from about 12 to 48 inches.

7. The structural panning material in accordance with claim 1, wherein the said panning material has a sandwich-type laminated structure and a fire resistance rating by the open-cup method of above 70° F.

8. The structural panning material in accordance with claim 1, wherein the said material is moistureproof, smokeproof, non-flammable and plyable having a metallic-finish and a bursting strength of about 300 psi by the Mullen test.

9. The structural panning material in accordance with claim 1, wherein the core portion of said panning material is a non-metallic corrugated construction formed of 26 pound corrugated paper medium and 42 pound paper linerboard with 0.00025 inch thick aluminum foil laminated to both sides of said core portion.

10. The structural panning material in accordance with claim 1, wherein the said material is lightweight having a density of about 0.15 pound per square foot.

11. In the construction of structural buildings having a plurality of hollow heating and cooling ducts formed on at least two sides by spaced-apart framing members, the improvement of a structural laminated panning material which is combinedly moistureproof, smokeproof and fireproof for forming ductwork and headers, said panning material comprising a core portion formed from a paper corrugating medium and paper linerboard members covering both faces of said corrugating medium and thin metallic foil facing members adhesively exteriorly attached to both said linerboard members, and a pair of parallel score lines formed adjacent at least two juxtaposed terminating edges of said panning material perpendicular to the direction of corrugations of said corrugating medium, said panning material being substantially planar, and rigid for permanent attachment to said spaced-apart framing members in either planar or right-angled relationship.

12. The improvement of a structural laminated panning material in accordance with claim 11, wherein said material is formed by waterproof and fireproof adhesive material into a sandwich-type thermally-insulating noncombustible material.

13. The improvement of a structural laminated panning material in accordance with claim 11, wherein said material has an overall thickness ranging from about 0.14 to 0.17 inch and a bursting strength by the Mullen test of about 300 psi.

14. The improvement of a structural laminated panning material in accordance with claim 11, wherein each of said pair of parallel score lines is scored on both sides to a depth ranging from about 0.025 to 0.035 inch to facilitate plyable right-angled bending and secure permanent attachment to said framing members.

15. The improvement of a structural laminated panning material in accordance with claim 11, wherein the said pair of parallel score lines is formed on both sides of said material in juxtaposed relation about 0.75 to 1.0 inch from each edge of said panning material.

16. The improvement of a structural laminated panning material in accordance with claim 11, wherein said material has a rectangular shape in plan and a width ranging from about 12 to 48 inches.

17. The improvement of a structural laminated material in accordance with claim 11, wherein said material has a sandwich-type structure, is moistureproof, smokeproof and fireproof and plyable having a fire resistance rating by the open-cup method of above 70° F. and a bursting strength of about 300 psi by the Mullen test.

18. The improvement of a structural laminated panning material in accordance with claim 11, wherein the said material is lightweight having a density of about 0.15 pound per square foot.

19. A plyable non-combustible planar laminated structural panning board for forming heating and cooling ducts and headers between spaced-apart parallel framing members in a structure, said panning board comprising a core portion of combined corrugated paper medium and a pair of paper linerboard members fully covering both faces of said corrugated paper medium and a pair of thin metallic foil facing members adhesively attached to both said linerboard members, said panning board having an overall width greater than the spacing between said framing members, and a pair of parallel score lines formed perpendicular to the direction of corrugations of said corrugating paper medium and adjacent at least two juxtaposed terminating edge portions of said panning board for attachment of said scored terminating edge portions to said spaced-apart framing members in either planar or right-angled relationship.

20. The planar laminated structural panning board in accordance with claim 19, wherein the said thin metallic foil facing members are comprised of aluminum having a thickness of about 0.00025 inch.

21. The planar laminated structural panning board in accordance with claim 19, wherein said parallel score lines are formed in said panning board at a dimension complemental to the spacing between said framing members for its permanent attachment to said framing members.

22. The planar structural panning board in accordance with claim 19, wherein the core portion and said thin metallic foil facing members are integrally joined into a sandwich-type structure by waterproof and fireproof adhesive material.

23. The planar structural panning board in accordance with claim 19, wherein said pair of parallel score lines is formed in said board at a distance of about 1 inch from the terminating edge portions of said board perpendicular to the direction of the corrugations of said corrugated paper medium to a depth ranging from about 0.025 to 0.035 inch on each side of said board in juxtaposed relation.

24. The planar structural panning board in accordance with claim 19, wherein the said panning board has a rectangular shape and a width ranging from about 12 to 48 inches.

25. The planar structural panning board in accordance with claim 19, wherein the said board has an overall thickness ranging from about 0.14 to 0.17 inch and a bursting strength by the Mullen test of greater than about 300 psi.

26. The planar structural panning board in accordance with claim 19, wherein the said board is nonflammable and moistureproof and has a fire resistance rating of greater than 70° F.

27. The planar structural panning board in accordance with claim 19, wherein the said board is nonflammable and moistureproof and has a flame spread index value of 70 and a smoke developed index value of 30 as tested by the ASTM E84-90 standard test method for surface burning characteristics of building materials.

* * * * *